(12) United States Patent
Ashjaee et al.

(10) Patent No.: US 8,094,087 B2
(45) Date of Patent: Jan. 10, 2012

(54) PORTABLE NAVIGATIONAL ANTENNA SYSTEM

(75) Inventors: Javad Ashjaee, Saratoga, CA (US); Alexander Andreevich Vyazov, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 588 days.

(21) Appl. No.: 12/234,605

(22) Filed: Sep. 19, 2008

(65) Prior Publication Data

US 2009/0195475 A1 Aug. 6, 2009

Related U.S. Application Data

(60) Provisional application No. 61/025,245, filed on Jan. 31, 2008.

(51) Int. Cl.
*H01Q 1/08* (2006.01)

(52) U.S. Cl. .......... 343/881; 881/915; 881/893
(58) Field of Classification Search ............. 343/881, 343/882, 915, 893
See application file for complete search history.

(56) References Cited

U.S. PATENT DOCUMENTS

| 6,198,460 B1* | 3/2001 | Brankovic | 343/879 |
| 6,353,419 B1* | 3/2002 | Gates et al. | 343/882 |
| 6,888,512 B1* | 5/2005 | Daigler | 343/878 |

* cited by examiner

*Primary Examiner* — Dieu H Duong
(74) *Attorney, Agent, or Firm* — Morrison & Foerster, LLP

(57) ABSTRACT

A portable navigation apparatus is provided. The apparatus includes a multi-antenna assembly configured for including an expanded configuration and a collapsed configuration. The antenna assembly includes a master antenna, and at least two auxiliary antennas. The at least two auxiliary antennas are radially distributed about the master antenna. Furthermore, the master antenna and auxiliary antennas are substantially coplanar when the antenna assembly is in the expanded configuration.

15 Claims, 5 Drawing Sheets

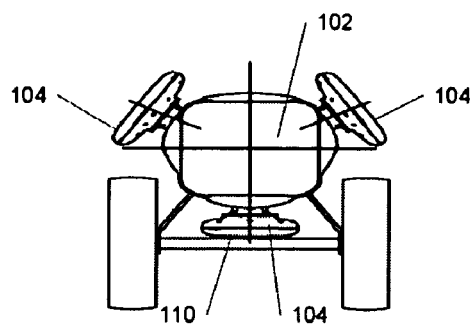
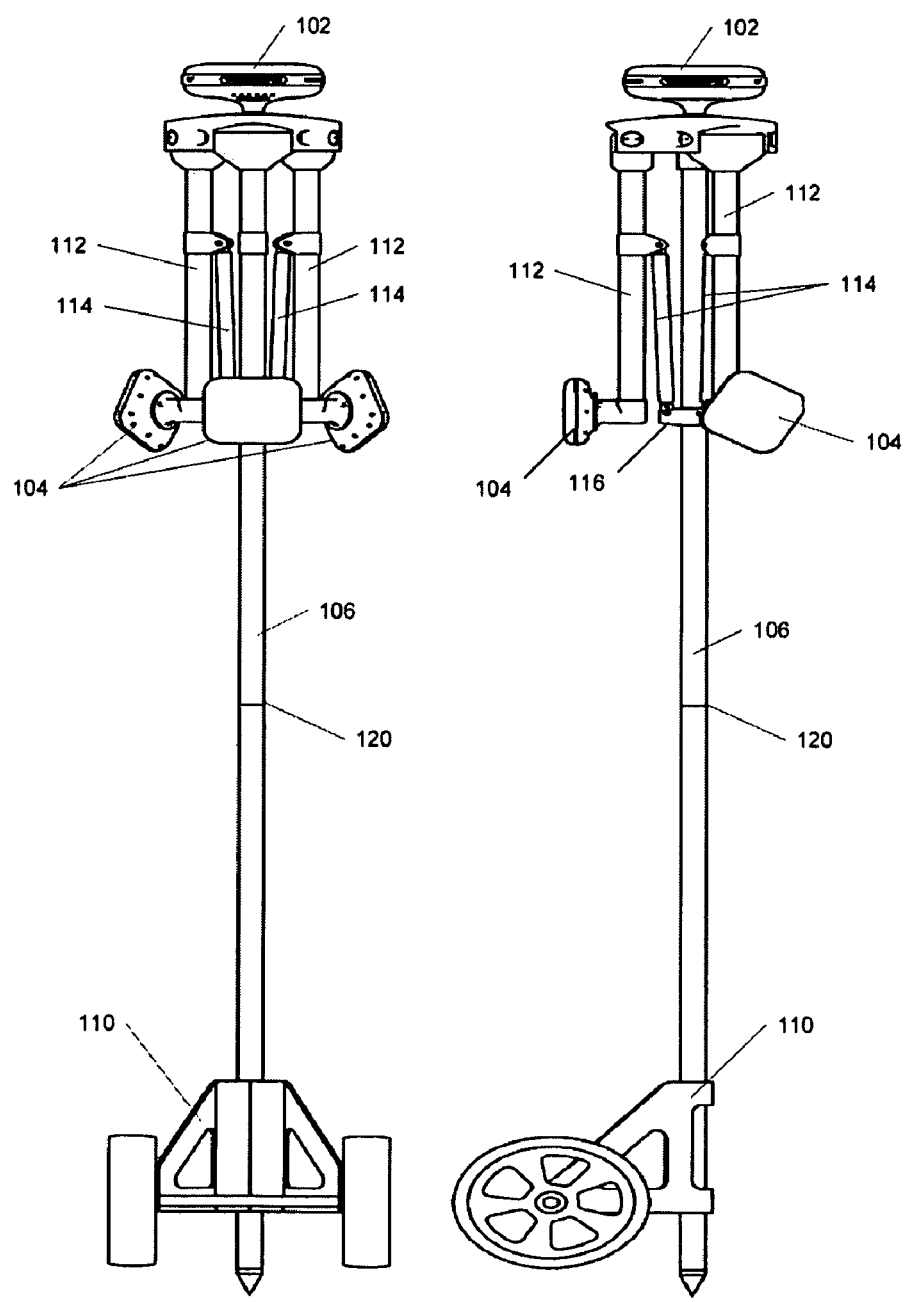
Fig. 2C
Fig. 2A    Fig. 2B

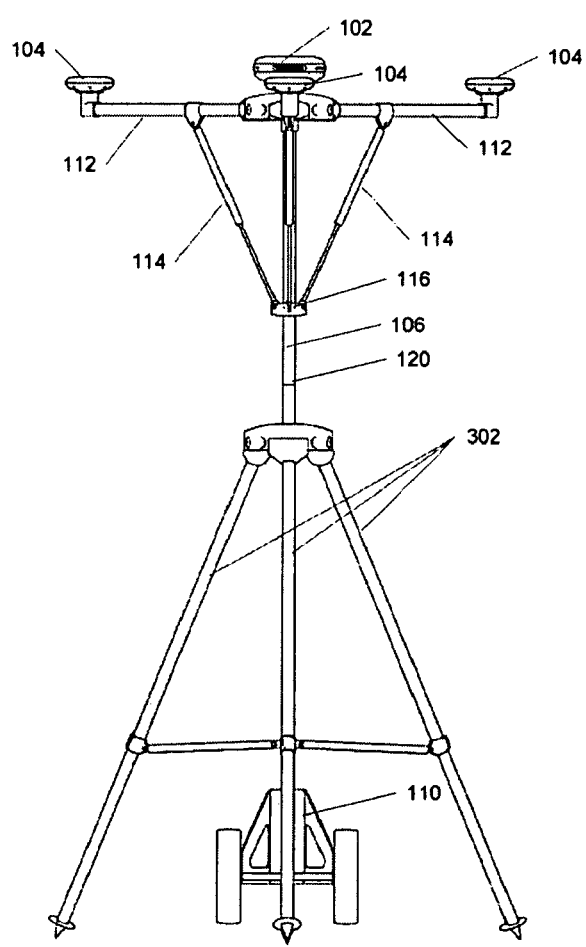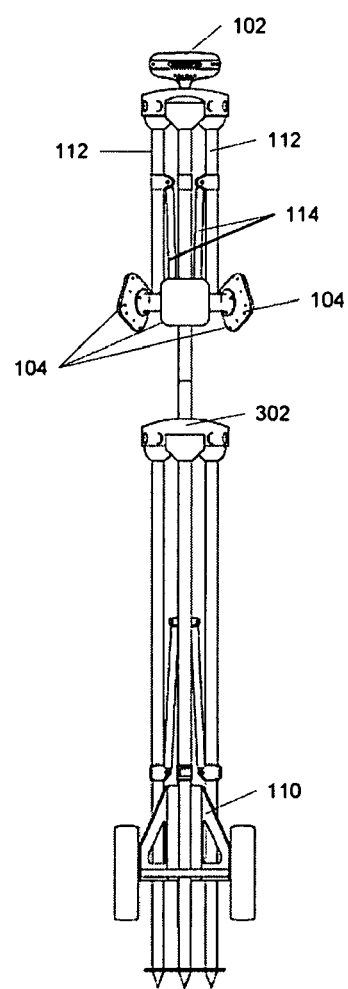
Fig. 3
Fig. 4

PORTABLE NAVIGATIONAL ANTENNA SYSTEM

CROSS REFERENCE TO RELATED APPLICATIONS

This application claims the benefit under 35 USC 119(e) of prior U.S. Provisional Patent Application No. 61/025,245, filed Jan. 31, 2008, the disclosure of which is hereby incorporated by reference in its entirety.

FIELD OF THE INVENTION

The present invention relates to a portable navigational system which uses multiple antennas.

BACKGROUND OF THE INVENTION

Navigation receivers that use the signals of the global navigation satellite systems, such as GPS and GLONASS (hereinafter collectively referred to as "GNSS") enable highly accurate position determination. A GNSS receiver receives and processes radio signals transmitted by the navigation satellites.

The need to improve positioning accuracies has led to the development of "differential navigation/positioning." In this mode, the user position is determined relative to the antenna connected to a base receiver ("base"), assuming that the coordinates of the base are known with high accuracy. The base receiver transmits its measurements (or corrections to the full measurements) to a mobile navigation receiver ("rover"). The rover receiver uses these corrections to refine its own measurements in the course of data processing. The rationale for this approach is that since the pseudo-range measurement errors on the base and rover sides are strongly correlated, using differential measurements will substantially improve the positioning accuracy.

Usually, the base is static and located at a known position. However, in relative navigation mode, both the base and rover are moving. In this mode, the user is interested in determining the vector between the base and the rover. In other words, the user is interested in determining the continuously changing position of the rover relative to the continuously changing position of the base. For example, when one aircraft or space vehicle is approaching another for in-flight refueling or docking, a highly accurate determination of the relative position between the two vehicles is important while the absolute position of each vehicle is generally not as critical.

In some situations, a position measurement may not be available because there is a shading of signals, for example. In other words, there may be a disappearance of measurements due to the shading of signals coming from one or several satellites that are tracked by a receiver. As a consequence, in conventional systems, the receiver working in either standalone or differential modes can lose the ability to determine position. To remedy this defect, multiple antennas may be used so that an obstacle does not shade all of the antennas simultaneously.

However, for a single user, portability of a multiple antenna system that is accurate and durable may be difficult. Therefore, a navigation apparatus that is portable and durable enough to preserve the configuration of antennas is desirable. Embodiments of the invention preserve the configuration of the antennas and provide a lightweight and compact assembly that is suitable for transporting. The multi-antenna feature helps to reduce signal shading and to improve antenna accuracy.

SUMMARY OF THE INVENTION

According to embodiments of the invention, a portable navigation apparatus is provided. The apparatus includes an antenna assembly configured for including an expanded configuration and a collapsed configuration. The antenna assembly includes a master antenna, and at least two auxiliary antennas. The at least two auxiliary antennas are radially distributed about the master antenna. Furthermore, the master antenna and auxiliary antennas are substantially coplanar when the antenna assembly is in the expanded configuration.

BRIEF DESCRIPTION OF THE FIGURES

FIG. 2A illustrates a perspective side-view of a navigation apparatus including an antenna assembly in a collapsed configuration according to embodiments of the invention;

FIG. 2B illustrates another perspective side-view of a navigation apparatus including an antenna assembly in a collapsed configuration according to embodiments of the invention;

FIG. 2C illustrates a top-view of a navigation apparatus including an antenna assembly in a collapsed configuration according to embodiments of the invention;

FIG. 3 illustrates a perspective side-view of a navigation apparatus including an antenna assembly in an expanded configuration according to embodiments of the invention;

FIG. 4 illustrates a perspective side-view of a navigation apparatus including an antenna assembly in a collapsed configuration according to some embodiments of the invention;

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention.

Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

Figures 1A, 1B, 1C:
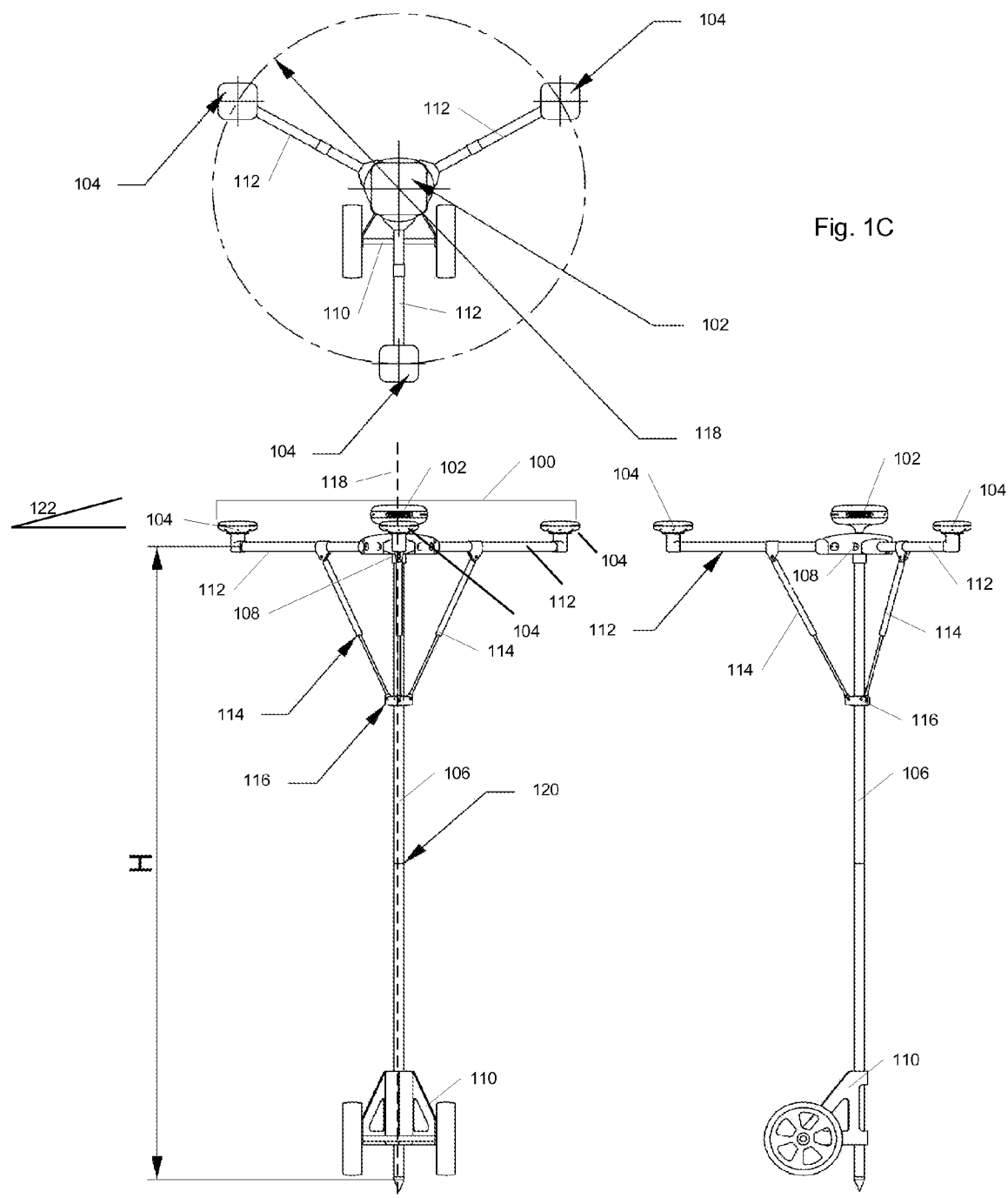
FIG. 1A illustrates a perspective side-view of a navigation apparatus including an antenna assembly in an expanded configuration according to embodiments of the invention.
FIG. 1B illustrates another perspective side-view of a navigation apparatus including an antenna assembly in an expanded configuration according to embodiments of the invention.
FIG. 1C illustrates a top-view of a navigation apparatus including an antenna assembly in an expanded configuration according to embodiments of the invention.

FIG. 1A illustrates a perspective side-view of a navigation apparatus including an antenna assembly in an expanded configuration according to embodiments of the invention. The navigation apparatus may be operable as a base receiver or rover receiver. An antenna assembly 100 includes a master antenna 102. Radially distributed about the master antenna 102 are auxiliary antennas 104. There are three auxiliary antennas 104 in the example shown in FIGS. 1A-1C. However, embodiments of the invention are not limited by three auxiliary antennas. In contrast to the expanded configuration of the antenna assembly 100 illustrated in FIGS. 1A-1C, the antenna assembly 100 is movable to a collapsed configuration (FIGS. 2A-2C). The antenna assembly 100 is operable in the expanded configuration.

FIG. 1B shows the navigation apparatus including an antenna assembly in an expanded configuration according to embodiments of the invention rotated from the view shown in FIG. 1A.

FIG. 1C illustrates a top-view of a navigation apparatus including an antenna assembly in an expanded configuration according to embodiments of the invention Each of the auxiliary antennas 104 is associated with an auxiliary support 112. At one end of the auxiliary support 112, the associated auxiliary antenna 104 is connected. At the other end of each auxiliary support 112, the master antenna 102 is connected so that the radial axis of the antenna assembly 118 is attached to the center of the master antenna. In some embodiments of this configuration, the master antenna 102 and auxiliary antennas 104 may lie substantially in the same plane, e.g., auxiliary antennas 104 may lie within 1 mm of the plane containing the master antenna. Therefore, the auxiliary supports 112 are substantially horizontal when the antenna assembly 100 is in an expanded configuration.

The elevation angle is the angle that a satellite forms with respect to the horizon, i.e. the surface of the globe. The elevation mask angle is the cut-off for satellites to be used in computing the position of the receiver such that satellites with elevation angles that are below the cut-off value are not used in the computation of the receiver's position. In some embodiments of the invention, the expanded configuration may be used with an elevation mask angle of 5 to 10 degrees. For example, in FIG. 1A, angle 122 represents an approximately 10 degree elevation mask.

Furthermore, in the expanded configuration, the auxiliary antennas are radially distributed about the master antenna 102 so that the auxiliary antennas and the master antenna are substantially coplanar, illustrated such that there is a diameter of the radially distributed auxiliary antennas, which is shown in FIG. 1C. In some embodiments, the diameter may be one meter.

According to embodiments of the invention, the radially distributed auxiliary antennas 104 are spaced so that each auxiliary antenna is at substantially equal angles to the adjacent auxiliary antenna, the vertex being the master antenna 102. In other embodiments, each radially distributed auxiliary antenna 104 moves no more than 1 mm, in any direction, once the navigation apparatus is in the expanded configuration. In some embodiments, the auxiliary antennas are not linearly positioned with reference to the other auxiliary antennas. The distance to each auxiliary antenna from the master antenna is no less than 0.5 meters in some embodiments.

An axis through the center of the master antenna 102, is substantially perpendicular to the plane that contains the master antenna. Slight errors may be compensated for with an inertial system. An inertial system may be included in the navigation apparatus.

A support 106 is connected, at a first end 108, to the antenna assembly 100 at the center of the master antenna 102. The support 106 is connected to the antenna assembly so that the auxiliary antennas 104 are radially distributed about the master antenna 102.

At a second end of the support 106, a transport assembly 110 is connected. The transport assembly 110 may be a trolley, for example. The transport assembly 110 facilitates the mobility of the navigation apparatus.

Furthermore, cross-bars 114 are connected to the antenna assembly 100. The cross-bars 114 are connected to the auxiliary supports 112 and the support 106 via a locking mechanism 116. When locked, as shown in FIGS. 1A-1C, the locking mechanism 116 holds the antenna assembly 100 in the expanded configuration. When the locking mechanism 116 is unlocked, it is able to slide along the support 106 to change the antenna assembly 100 into the collapsed configuration.

In embodiments of the invention, the coaxial cable of the auxiliary antennas can be inserted through the auxiliary supports 112 to the receiver. The support 106 may also have a detachable joint 120 to allow for disassembly of the support 106 for more compatibility and convenience. In some embodiments, the height of the navigation apparatus may be 2 meters and the diameter of the antenna assembly may be 1 meter. In other embodiments, when the detachable joint 120 is detached from the support 106, the height of the navigation apparatus may be 1 meter and the diameter of the antenna assembly may be 1 meter.

The navigation apparatus may be constructed from materials that are durable, lightweight, and are able to preserve the configuration of the antennas. For example, the components of the navigation apparatus, such as the support 106, the auxiliary supports 112, and cross-bars 114, may be constructed out of materials such as, but not limited to, aluminum, fiberglass, or carbon. Maintaining the configuration and the intended dimensions of the navigation apparatus is an important factor in obtaining accurate positioning measurements.

FIGS. 2A-2C show different perspective views of a navigation apparatus in a collapsed configuration.

FIG. 2A illustrates a perspective side-view of a navigation apparatus in a collapsed configuration according to embodiments of the invention. FIG. 2B illustrates another side-view that has been rotated of a navigation apparatus in a collapsed configuration. And FIG. 2C illustrates a top-view of a navigation apparatus in a collapsed configuration.

In some embodiments of the invention, there may be a further support structure connected to the support 106 for greater stability for more accurate measurements. For example, FIG. 3 illustrates a side-view of a navigation apparatus with the antenna assembly in an expanded configuration with an additional tripod support 302.

The tripod support 302 may also be collapsed to make the navigation apparatus more compact. FIG. 4 illustrates the tripod support 302 in the collapsed configuration, as well as the antenna assembly in a collapsed configuration.

Figure 5B:
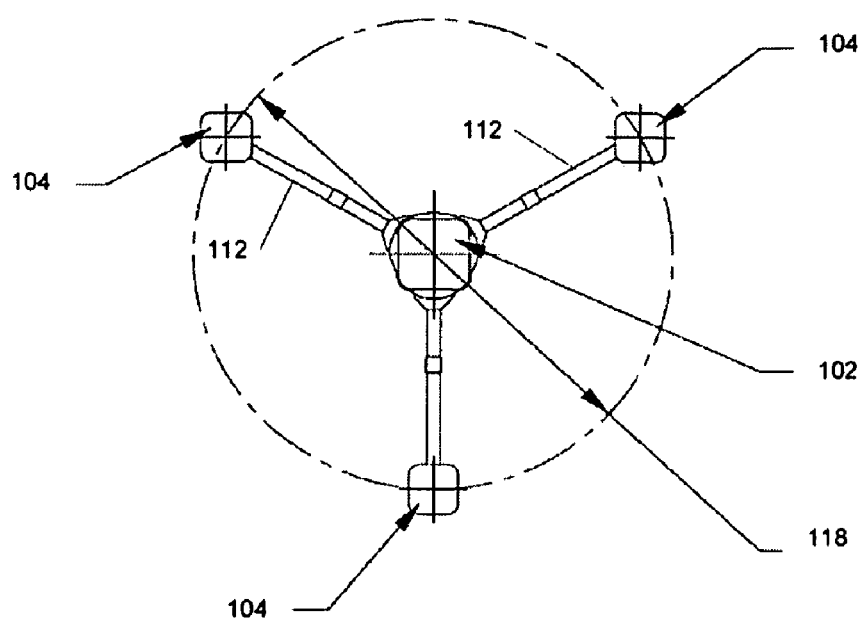
FIG. 5B illustrates a perspective top-view of a navigation apparatus including an antenna assembly in an expanded configuration without a transport assembly according to embodiments of the invention.
Figure 5A:
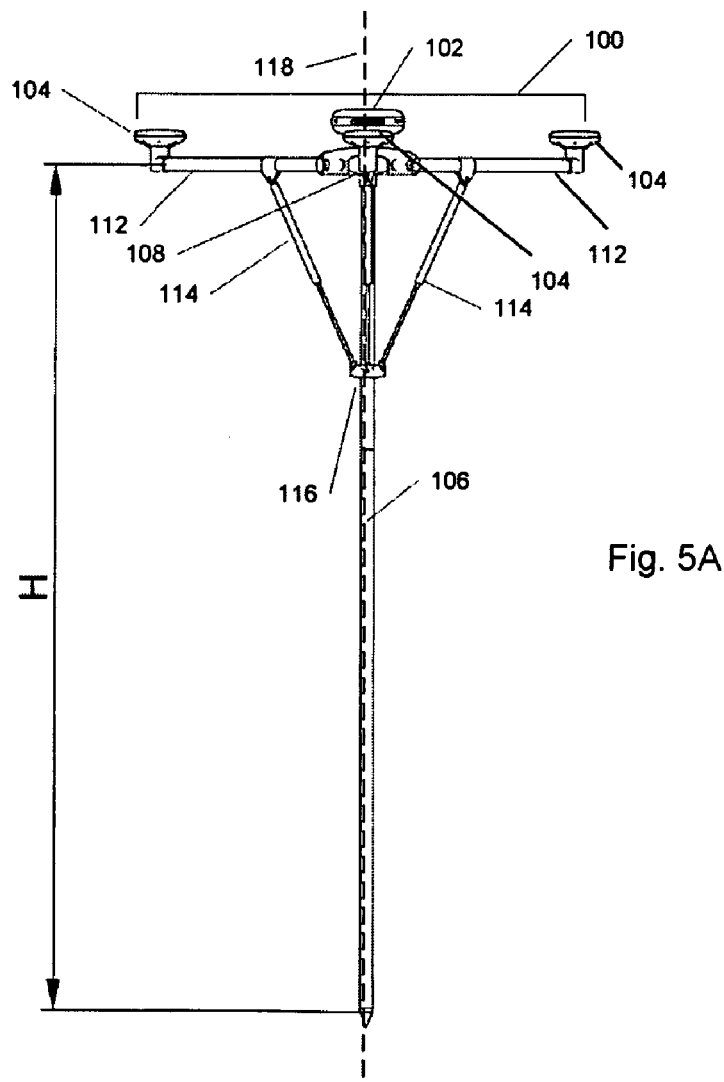
FIG. 5A illustrates a perspective side-view of a navigation apparatus including an antenna assembly in an expanded configuration without a transport assembly according to embodiments of the invention.
Figure 6B:
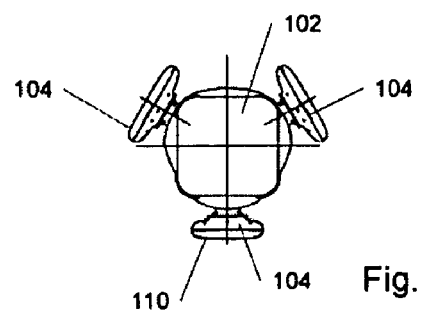
FIG. 6B illustrates a perspective top-view of a navigation apparatus including an antenna assembly in a collapsed configuration without a transport assembly according to embodiments of the invention.
Figure 6A:
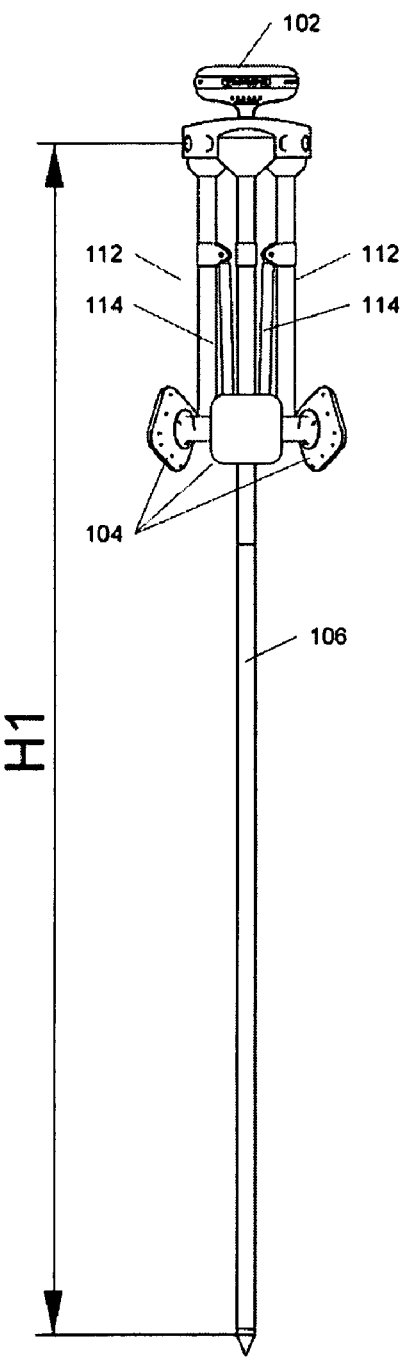
FIG. 6A illustrates a perspective side-view of a navigation apparatus including an antenna assembly in a collapsed configuration without a transport assembly according to embodiments of the invention.

In some embodiments, the navigation apparatus may not include a transport assembly, as illustrated in the side-view of FIG. 5A and the top-view of FIG. 5B. In FIGS. 5A and 5B, the antenna assembly is in an expanded configuration. FIGS. 6A and 6B illustrate the navigation apparatus without a connected transport assembly while the antenna assembly is in a collapsed configuration.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A navigation apparatus comprising:
   a main support;
   an antenna assembly, connected to the main support, having an expanded configuration and a collapsed configuration, wherein the antenna assembly comprises:
      a master antenna;
      at least two auxiliary antennas, wherein the at least two auxiliary antennas are radially distributed about the master antenna, and the master antenna and auxiliary antennas are substantially coplanar when the antenna assembly is in the expanded configuration;
      at least two auxiliary supports, each auxiliary support for supporting an auxiliary antenna; and
      at least two crossbars, wherein each crossbar is coupled at a point on the crossbar to a point between two ends of an auxiliary support of the at least two auxiliary supports in the collapsed configuration, and movably coupled at another point on the crossbar to the main support.

2. The navigation apparatus of claim 1, further comprising a transport assembly connected to the main support.

3. The navigation apparatus of claim 2, wherein the transport assembly is a trolley.

4. The navigation apparatus of claim 1, wherein, in the collapsed configuration, each auxiliary support is folded towards the main support, and the main support lies along an axis perpendicular to the plane that contains the master and auxiliary antennas.

5. The navigation apparatus of claim 1, wherein every auxiliary support is spaced at substantially equal angles from each adjacent auxiliary support.

6. The navigation apparatus of claim 1, wherein each auxiliary support is substantially at 120 degrees from each adjacent auxiliary support.

7. The navigation apparatus of claim 1, wherein each auxiliary antenna remains substantially static once the navigation apparatus is in the expanded configuration.

8. The navigation apparatus of claim 1, wherein a diameter of the antenna assembly determined by the radially distributed auxiliary antenna is 1 meter.

9. The navigation apparatus of claim 1, wherein the height of the navigation apparatus is 1 meter.

10. The navigation apparatus of claim 1, wherein the height of the navigation apparatus is 2 meters.

11. The navigation apparatus of claim 1, wherein the master antenna and the at least two auxiliary antennas are GPS antennas.

12. The navigation apparatus of claim 1, wherein the master antenna and the at least two auxiliary antennas are GNSS antennas.

13. The navigation apparatus of claim 1, wherein the navigation apparatus is used with an elevation mask angle of 5 to 10 degrees.

14. The navigation apparatus of claim 1, wherein the main support is constructed out of one of the following of a group consisting of: aluminum, fiberglass, and carbon.

15. The navigation apparatus of claim 1, wherein the auxiliary supports are constructed out of one of the following of a group consisting of: aluminum, fiberglass, and carbon.

\* \* \* \* \*